United States Patent
Chou

(10) Patent No.: US 8,305,966 B2
(45) Date of Patent: Nov. 6, 2012

(54) FEMTO BACKHAUL FAULT DETECTION AND RECOVERY

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 12/826,632

(22) Filed: Jun. 29, 2010

(65) Prior Publication Data
US 2011/0317544 A1 Dec. 29, 2011

(51) Int. Cl.
*H04W 4/00* (2009.01)
(52) U.S. Cl. ....................................................... 370/328
(58) Field of Classification Search .................... None
See application file for complete search history.

(56) References Cited

U.S. PATENT DOCUMENTS

| | | | |
|---|---|---|---|
| 2009/0286540 A1* | 11/2009 | Huber et al. | 455/435.1 |
| 2010/0027431 A1 | 2/2010 | Morrison et al. | |
| 2010/0111013 A1 | 5/2010 | Chou | |
| 2010/0124933 A1* | 5/2010 | Chowdhury et al. | 455/453 |
| 2010/0128708 A1 | 5/2010 | Liu et al. | |
| 2010/0214977 A1* | 8/2010 | Hegde | 370/328 |
| 2011/0013528 A1* | 1/2011 | Chen | 370/252 |
| 2011/0035592 A1* | 2/2011 | Cha et al. | 713/169 |

OTHER PUBLICATIONS

International Search Report mailed Feb. 9, 2012 in International Application No. PCT/US2011/042049.

\* cited by examiner

*Primary Examiner* — Raj Jain
(74) *Attorney, Agent, or Firm* — Schwabe, Williamson & Wyatt, P.C.

(57) ABSTRACT

Embodiments of methods and apparatus for monitoring a backhaul channel associated with a femto access point (FAP) are disclosed. There is disclosed a method comprising: transmitting, by an FAP over a backhaul channel to a gateway associated with a first network, a plurality of requests, wherein individual requests of the plurality of requests are transmitted periodically and the backhaul channel comprises a second network that is different from the first network; and receiving, by the FAP from the gateway over the backhaul channel, one or more responses indicating an operational state of the backhaul channel, wherein the one or more responses are received in response to a corresponding one or more requests of the plurality of requests. Additional variants and embodiments are also disclosed.

20 Claims, 6 Drawing Sheets

FEMTO BACKHAUL FAULT DETECTION AND RECOVERY

TECHNICAL FIELD

The present disclosure relates generally to wireless communication systems, and more particularly, to methods and apparatus for femto backhaul fault detection and recovery.

BACKGROUND

A femto access point (FAP) is a relatively low power and relatively small base station, designed generally, for example, for use at home or at small businesses. The FAP usually connects to a service provider's network via a broadband access network (e.g., via a digital subscriber line (DSL) line, a fiber line, a cable, and/or the like). Thus, a client device connects to the service provider's network via the locally disposed FAP, rather than via a remotely disposed base station (BS) of the service provider's network. The FAP may be used to extend service coverage to areas where services through remotely disposed BS of the service provider's network may otherwise be limited or unavailable.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION

Illustrative embodiments of the disclosure include, but are not limited to, methods and apparatuses for monitoring backhaul channel of a femto access point (FAP), and detecting and/or recovering from failures in the backhaul channel.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

Figure 1:
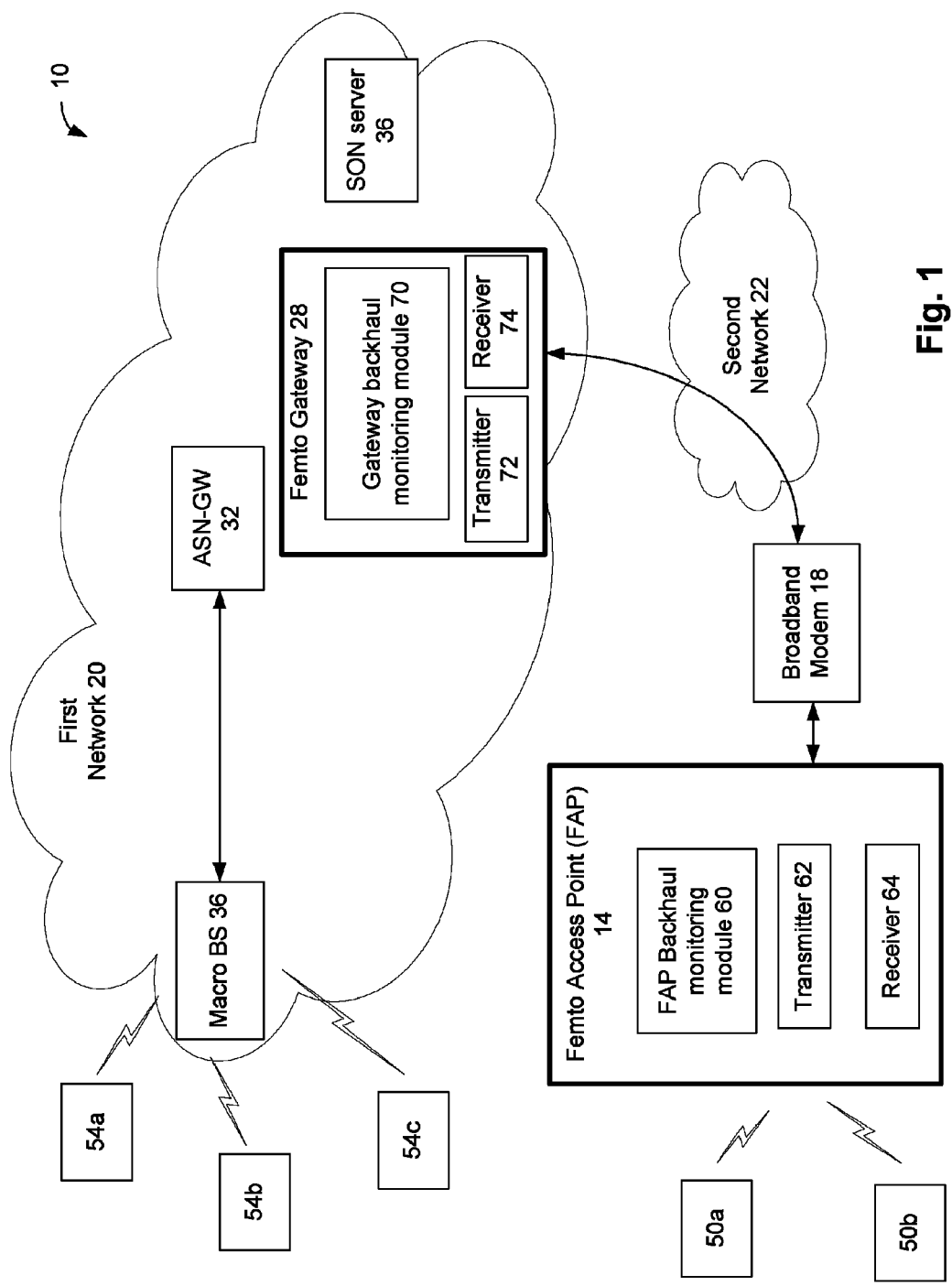
FIG. 1 schematically illustrates a communication system, in accordance with various embodiments of the present disclosure.

FIG. 1 schematically illustrates a communication system 10, in accordance with various embodiments of the present disclosure. The communication system 10 includes a first network 20. The first network 20 includes a number of components capable of communicating with each other using a common communication standard. The network shown and described herein are not limited to, or restricted by, the specific components illustrated as residing therein in the figures.

In various embodiments, communications within the first network 20 may be in compliance with a Worldwide Interoperability for Microwave Access (WiMAX) standard or future generations of WiMAX, and/or may be in compliance with an Institute of Electrical and Electronics Engineers 802.16 standard (e.g., IEEE 802.16—2009, approved May 13, 2009, along with any amendments, updates, and/or revisions, e.g., 802.16m, which is presently at predraft stage). In various other embodiments, communications within the first network 20 may be in compliance with a Third Generation Partnership Project Long Term Evolution (3GPP LTE), an LTE advanced protocol, an ultra mobile broadband (UMB) project, a 3GPP2 Air Interface Evolution (3GPP2 AIE) standard, and/or a future generation cellular broadband network standard. In various other embodiments, communications within the first network 20 may be in compliance with additional/alternative communication standards and/or specifications. In various embodiments, the first network 20 may comprise any type of orthogonal frequency division multiple access (OFDMA) based wireless network, and the scope of the present disclosure is not limited in these respects.

In various embodiments, the first network 20 may include an access service network gateway (ASN-GW) 32 that may be operatively coupled to a macro base station (BS) 36 associated with the first network 20. In various embodiments, the macro BS 36 may provide wireless service to a plurality of client devices (e.g., client devices 54a, 54b, 54c, etc.) over a relatively large geographical area (e.g., large compared to a geographical area served by an FAP 14, as discussed herein later). The three client devices 54a, . . . , 54c of FIG. 1 are exemplary in nature, and in various other embodiments, more or less than three client devices may be served by the macro BS 36. Although only one macro BS (e.g., macro BS 36) is illustrated in FIG. 1, the communication system 10 may include one or more other macro BSs.

In various embodiments, the communication system 10 may also include an FAP 14, which may be used to provide service to a relatively small number (e.g., small compared to a number of client devices served by the macro BS 36) of client devices 50*a*, 50*b*, etc. In various embodiments, each of the client devices 50*a* and/or 50*b* may comprise a laptop, a desktop, a cellular or mobile phone, a camera, an audio and/or video player (e.g., an MP3 player), a mobile station, and/or any appropriate consumer electronics device capable of communicating with the FAP 14 and receiving service from the FAP 14. In various embodiments, the FAP 14 may be configured to serve one or more client devices 50*a* and 50*b* over a relatively small geographical area, and may be used, for example, at home or at small businesses.

The two client devices 50*a* and 50*b* of FIG. 1 are exemplary in nature, and in various other embodiments, more or less than two client devices may be served by the FAP 14. Although only one FAP (e.g., FAP 14) is illustrated in FIG. 1, the communication system 10 may include one or more other FAPs serving one or more other client devices.

In various embodiments, the FAP 14 may be used to extend service coverage of the first network 20 to areas where services through a macro BS (e.g., the macro BS 36) may otherwise be limited or unavailable. The FAP 14 may be configured to communicate with a femto gateway 28 associated with the first network 20, through a second network 22. In various embodiments, the second network may be a broadband access network, an internet access network, and/or the like. In various embodiments, the second network 22 may comprise a digital subscriber link, a cable Internet access link, or the like. The FAP 14 may be connected to the second network 22 through, for example, a broadband modem 18. The FAP 14 may communicate with the broadband modem 18 using an appropriate wired or wireless communication link (e.g., over a local area network).

In various embodiments, the broadband modem 18 and the second network 22 may be a part of a backhaul channel used for connecting the FAP 14 to the femto gateway 28. In various embodiments, the second network 22 may be different from the first network 20. For example, the second network 22 may operate on a standard or a technology that is different from a standard or technology on which the first network 20 operates. In another example, an owner and/or an operator of the second network 22 may be different from those of the first network 20.

In various embodiments, in the communication system 10, the client device 50*a* and/or 50*b* may connect to, and receive service from, the first network 20 via the locally disposed FAP 14. For example, the client devices 50*a* and/or 50*b* may receive wireless voice and/or data service from the first network 20, through the FAP 14.

The first network 20 may also include a self organizing network (SON) server 36. In various embodiments, the SON server 36 may be configured to measure and/or analyze performance data of the first network 20, fine-tune network attributes of the first network 20, be associated with allocation of frequencies to one or more FAPs and/or macro BSs, and/or the like.

Although not illustrated in FIG. 1, the first network 20 may also include one or more other components (e.g., an authentication, Authorization and Accounting (AAA) server).

In various embodiments, operations of the FAP 14 may rely on the backhaul channel in order to provide satisfactory service to the client devices 50*a* and 50*b*. As previously alluded to, in various embodiments, the FAP 14 may be disposed at a home or at a small business. In a case of an interruption of service provided by the FAP 14, a user of the client devices 50*a* and/or 50*b* may not be able to readily determine a reason behind the interruption (e.g., whether the interruption is due to a fault in the FAP 14 or due to a fault in the backhaul channel). In various embodiments, it may be desirable that the FAP 14 be able to detect a reason behind such interruption. For example, it may be desirable that the FAP 14 be able to monitor a condition of the backhaul channel, and be able to automatically detect any fault or failure in the backhaul channel. Such monitoring and automatic detection may enhance user experience (e.g., experience of the user of the FAP 14 and/or the client devices 50*a* and/or 50*b*), decrease user frustration, and/or prevent a truck roll by an operator of the first network 20 in the user's premise in an event of a failure in the backhaul channel.

In various embodiments, the FAP 14 may include a FAP backhaul monitoring module 60 (hereinafter also referred to as "module 60"). In various embodiments, the module 60 may be configured to monitor an operation of the backhaul channel. For example, the module 60 may be configured to detect an operational state and/or a failure state of the backhaul channel, as will be discussed in more details herein later. The FAP 14 may also include a transmitter 62 and a receiver 64 for communicating with the femto gateway 28.

In various embodiments, the femto gateway 28 may include a gateway backhaul monitoring module 70 (hereinafter also referred to as "module 70"), which may also be configured to monitor an operation of the backhaul channel. The femto gateway 28 may also include a transmitter 72 and a receiver 74 for communicating with the FAP 14.

Figure 2:
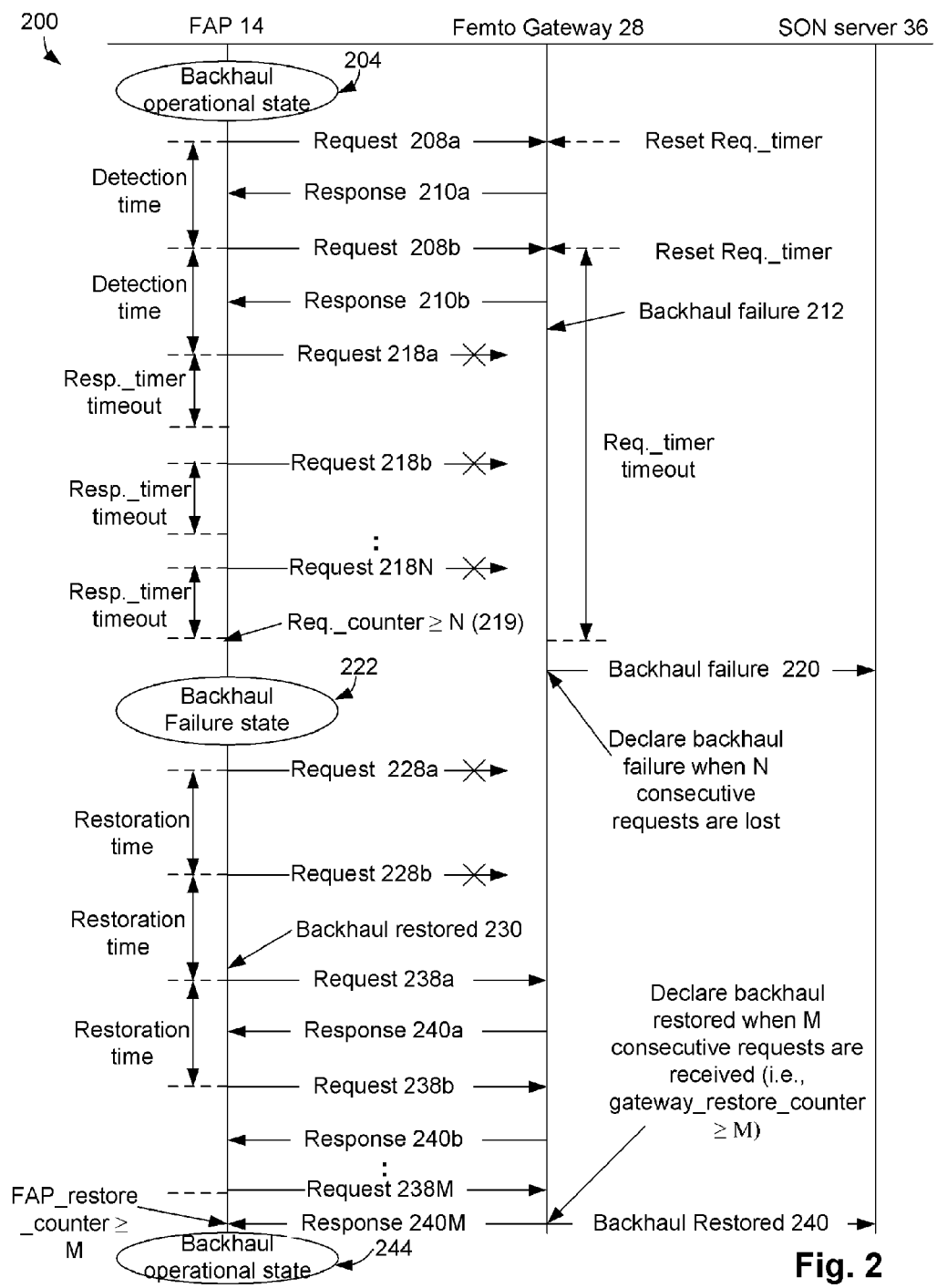
FIGS. 2-5 illustrate exemplary methods for monitoring an operation of a backhaul channel of the communication system of FIG. 1, in accordance with various embodiments of the present disclosure.

FIG. 2 illustrates an exemplary method 200 for monitoring an operation of the backhaul channel of the communication system 10 of FIG. 1, in accordance with various embodiments of the present disclosure. One or more operations of the method 200 may be carried by the FAP 14 and/or the femto gateway 28. Referring to FIGS. 1 and 2, at 204, the backhaul channel may be operational, and accordingly, the FAP 14 may operate in a backhaul operational state. In the backhaul operational state, for example, the backhaul channel may operatively couple, and facilitate communication between the FAP 14 and the femto gateway 28.

In various embodiments, the FAP 14 (e.g., the transmitter 62) may periodically transmit, over the backhaul channel to the femto gateway 28, a plurality of keep-alive requests (hereinafter also referred to as "requests"). For example, as illustrated in FIG. 2, the FAP 14 may transmit requests 208*a* and 208*b* to the femto gateway 28 over the backhaul channel. In FIG. 2, the two requests (i.e., requests 208*a* and 208*b*) transmitted by the FAP 14 is exemplary in nature, and in various other embodiments, the FAP 14 may transmit any other number of requests. In various embodiments, the FAP 14 may transmit the plurality of requests 208*a* and 208*b* to the femto gateway 28 at an interval of a detection time.

While the backhaul channel is operational, the femto gateway 28 (e.g., the receiver 74) may receive the requests 208*a* and 208*b* over the backhaul channel. In various embodiments, based at least in part on receiving the requests 208*a* and 208*b*, the femto gateway 28 (e.g., module 70) may determine that the backhaul channel is operational.

In various embodiments, while the backhaul channel is operational, in response to periodically receiving the plurality of requests from the FAP 14, the femto gateway 28 (e.g., the transmitter 72) may periodically transmit a corresponding plurality of keep-alive responses (hereinafter also referred to as "responses") to the FAP 14 over the backhaul channel. For example, in response to receiving the requests 208*a* and 208*b*, the femto gateway 28 may transmit corresponding responses 210*a* and 210*b*, respectively, to the FAP 14 over the backhaul channel, as illustrated in FIG. 2.

In various embodiments, each time the femto gateway 28 receives a request from the FAP 14, the femto gateway 28 (e.g., the module 70) may reinitialize a timer keepAliveReq-Timer (hereinafter also referred to as "request_timer" or "req._timer"), as illustrated in FIG. 2.

Based at least in part on receiving the responses 210*a* and 210*b*, the FAP 14 (e.g., the module 60) may determine that the backhaul channel is operational, and accordingly, the FAP 14 may continue to remain in the backhaul operational state.

In various embodiments, at each detection time interval, the FAP 14 may transmit a request to the femto gateway 28, and the FAP 14 (e.g., the module 60) may restart or reactivate a timer keepAliveRespTimer (hereinafter also referred to as "response_timer" or "resp._timer"). If no response is received by the FAP 14 from the femto gateway 28 within a first threshold time period (illustrated in FIG. 2 as resp._timer timeout) from a transmission of a corresponding request, the module 60 may increment a counter keepAliveRespCounter (hereinafter also referred to as "response_counter" or "resp._counter") by one, which may indicate a failure or non-receipt of a response to the corresponding request. If a response is received by the FAP 14 from the femto gateway 28 within the first threshold time period, the FAP 14 may reset (e.g., set to 0) the counter keepAliveRespCounter. In various embodiments, the first threshold time is greater than an expected time for receiving a response, by the FAP 14 from the femto gateway 28, in response to transmitting a corresponding request by the FAP 14 to the femto gateway 28. In an example, the first threshold time may be less than or equal to the detection time.

In various embodiments, subsequent to receiving the response 210*b* by the FAP 14, the backhaul channel may fail at 212, as illustrated in FIG. 2. The backhaul channel may fail for a variety of reasons, e.g., for problems associated with one or more components (e.g., the broadband modem 18, the second network 22, etc.) of the backhaul channel.

Due to the failure of the backhaul channel, the femto gateway 28 may not receive requests 218*a*, 218*b*, . . . , 218N transmitted by the transmitter 62 over the failed backhaul channel. The cross mark (x) over the requests 218*a*, 218*b*, . . . , 218N in FIG. 2 indicates non-receipt of the requests 218*a*, 218*b*, . . . , 218N by the femto gateway 28.

In various embodiments, if no request is received by the femto gateway 28 from the FAP 14 within a second threshold time period, the femto gateway 28 (e.g., the module 70) may determine a failure in the backhaul channel. For example, if the request_timer exceeds the second threshold time period (illustrated as "req._timer timeout" in FIG. 2), the module 70 may determine a failure in the backhaul channel. In various embodiments, the second threshold time period is greater than N times the detection time, where N is an integer (wherein the integer N is referred to in operation 219 of FIG. 2). Thus, the request_timer may exceed the second threshold time period based on non-receipt of at least N number of consecutive requests from the FAP 14 over the backhaul channel. In such an event, at 220, the module 70 may declare a backhaul failure. In various embodiments, at 220, the femto gateway 28 (e.g., the transmitter 72) may transmit a message regarding the backhaul failure to the SON server 36.

Also, no response may be received by the FAP 14 from the femto gateway 28 in response to transmitting the request 218*a* to the femto gateway 28 (e.g., due to the failure of the backhaul channel). Accordingly, as previously discussed, the request counter may be incremented by one at least after the first threshold time (illustrated as resp._timer timeout in FIG. 2) from the transmission of the request 218*a*. Similarly, the request counter may be incremented by one each time the FAP 14 fails to receive responses corresponding to the transmitted requests 218*b*, . . . , 218N. Once the request counter reaches a threshold value (e.g., threshold value of N, illustrated as "Req._counter≧N (219)" in FIG. 2, wherein N is an integer), the FAP 14 (e.g., the module 60) may declare a backhaul failure and enter a backhaul failure state at 222. Thus, based on non-receipt of at least N consecutive responses in response to transmitting corresponding N consecutive requests, the FAP 14 may enter the backhaul failure state at 222.

In various embodiments, upon entering the backhaul failure state, the FAP 14 may request one or more of the client devices 50*a* and 50*b* to handoff to neighboring BSs (e.g., the macro BS 36), if services from neighboring BSs are available to the client devices 50*a* and/or 50*b*. For example, the FAP 14 (e.g., the transmitter 62) may transmit a deregistration request message (e.g., a DREG_CMD message with action code of zero) to the client devices 50*a* and 50*b*, requesting the client devices 50*a* and 50*b* to handoff to a neighboring macro BS. In various embodiments, the FAP 14 may subsequently disable a radio transmitter used for communication with the client devices 50*a* and 50*b*. For example, the FAP 14 may disable the radio transmitter periodically to save power.

In various embodiments, after the FAP 14 has declared the backhaul failure state at 222, the FAP 14 (e.g., the transmitter 62) may continue transmitting requests to the module 70 over the backhaul channel on a periodic basis with a period equal to a restoration time. In various embodiments, the restoration time may be, for example, greater than the detection time. For example, as illustrated in FIG. 2, the FAP 14 may transmit requests 228*a* and 228*b* to the module 70 over the backhaul channel. Due to the failure of the backhaul channel, the requests 228*a* and 228*b* may not reach the femto gateway 28, as illustrated in FIG. 2.

The backhaul channel may be restored at 230 (i.e., after transmission of the request 228*b*). Accordingly, a request 238*a*, transmitted by the FAP 14 after restoration of the backhaul channel, may reach the femto gateway 28. In various embodiments, the femto gateway 28 (e.g., the module 70) may increment a counter gateway_restore_counter each time the femto gateway 28 (e.g., the receiver 74) receives a request during a failure state of the backhaul channel. Accordingly, in response to receiving the request 238*a*, the femto gateway 28 may increment the gateway_restore_counter by one. Furthermore, in response to receiving the request 238*a*, the femto gateway 28 (e.g., the transmitter 72) may transmit a response 240*a* to the FAP 14.

In various embodiments, the femto gateway 28 may increment a counter FAP_restore_counter each time the FAP 14 receives a response during a failure state of the backhaul channel. Accordingly, in response to receiving the response 240*a*, the module 60 may increment the FAP_restore_counter by one.

Similarly, the FAP 14 may continue to periodically transmit requests 238*b*, . . . , 238M to the femto gateway 28. Based at least in part on receiving the requests 238*b*, . . . , 238M, the module 70 may increment the gateway_restore_counter accordingly. Once the gateway_restore_counter equals or exceeds a threshold number M (wherein M is an integer, and is referred to in operations 238 and 240 of FIG. 2), the module 70 may declare the backhaul channel to be operational once again. Thus, the module 70 may declare the backhaul channel to be operational one again in response to receiving at least M (wherein M is also referred to in operations 238 and 240 of FIG. 2) consecutive requests from the module 60. At 240, the module 70 may inform the SON server regarding restoration of the backhaul channel.

Also, in response to receiving the requests 238b, . . . , 238M, the femto gateway 28 may transmit responses 240b, . . . , 240M to the module 60 over the backhaul channel. Furthermore, based on receiving the responses 240b, . . . , 240M, the module 60 may increment the FAP_restore_counter accordingly. Once the FAP_restore_counter equals or exceeds the threshold number M, the module 60 may declare the backhaul channel to be operational once again. Thus, the module 60 may declare the backhaul channel to be operational once again based on receiving at least M consecutive responses from the femto gateway 28. At 244, the module 60 may enter the backhaul operational state. In the backhaul operational state, for example, the FAP 14 may restart to provide services to the client devices 50a and/or 50b.

Figure 3:
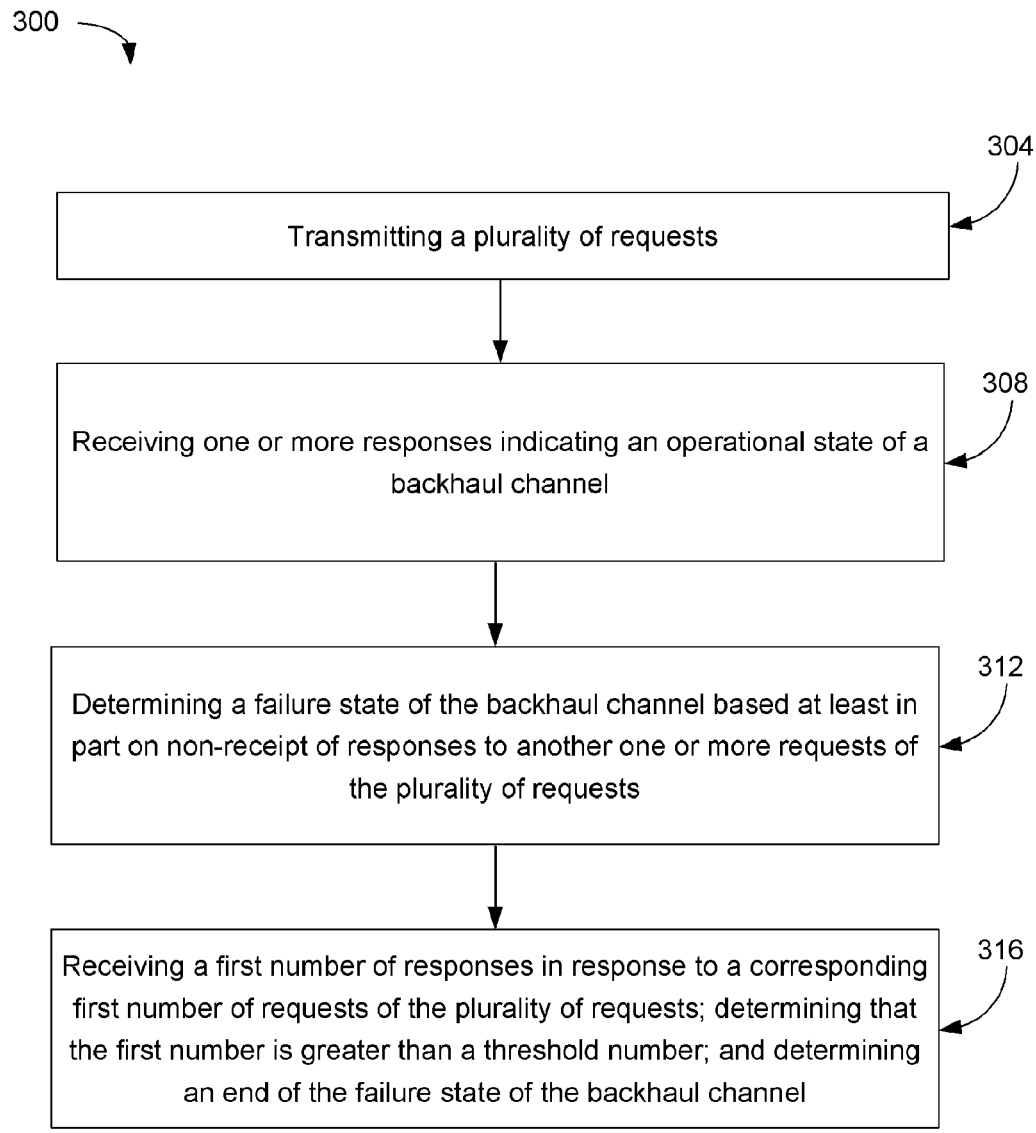

FIG. 3 illustrates another exemplary method 300 for monitoring an operation of the backhaul channel of the communication system 10 of FIG. 1, in accordance with various embodiments of the present disclosure. One or more operations of the method 300 may be performed by the FAP 14. Referring to FIGS. 1-3, at 304, the FAP 14 (e.g., the transmitter 62) may transmit a plurality of requests (e.g., requests 208a, 208b, 218a, . . . , 218N, 228a, 228b, 238a, . . . , 238M of FIG. 2) to the femto gateway 28 over the backhaul channel.

At 308, the FAP 14 (e.g., the receiver 64) may receive one or more responses (e.g., responses 210a and 210b of FIG. 2), from the femto gateway 28 over the backhaul channel, indicating an operational state of a backhaul channel. In various embodiments, the one or more responses may be received in response to a corresponding one or more requests (e.g., requests 208a and 208b) of the plurality of requests.

At 312, the FAP 14 (e.g., the module 60) may determine a failure state of the backhaul channel based at least in part on non-receipt of responses to another one or more requests (e.g., requests 218a, . . . , 218N) of the plurality of requests. In various embodiments, the another one or more requests may include at least a threshold number of consecutive requests (e.g., N number of consecutive requests, where N is an integer). In various embodiments, determination of non-receipt of a first response may be based on a predetermined time period passing after a first request (e.g., request 218a) of the another one or more requests is transmitted. For example, as previously discussed, a time of the response_timer exceeding the first threshold time period may indicate a failure or non-receipt of a response to a corresponding request.

At 316, the FAP 14 may receive at least a first number of responses (e.g., responses 240a, . . . , 240M) in response to a corresponding first number of requests (e.g., requests 238a, . . . , 238M) of the plurality of requests, and may determine that the first number is greater than a threshold number M. Based on determining that the first number is greater than the threshold number M, the FAP 14 may determine an end of the failure state of the backhaul channel, as illustrated by block 244 in FIG. 2.

Figure 4:
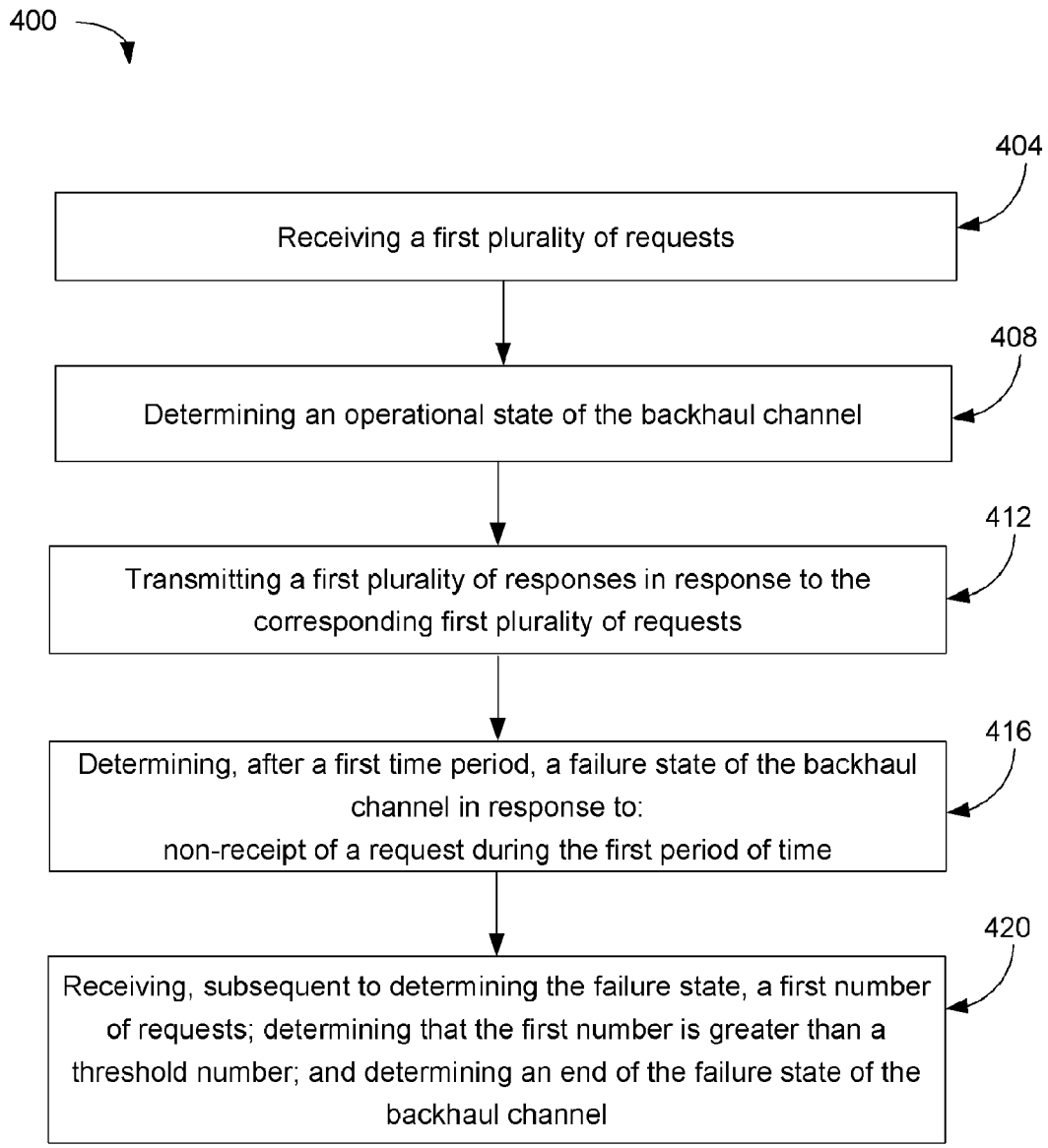

FIG. 4 illustrates another exemplary method 400 for monitoring an operation of the backhaul channel of the communication system 10 of FIG. 1, in accordance with various embodiments of the present disclosure. One or more operations of the method 400 may be performed by the femto gateway 28.

Referring to FIGS. 1-2 and 4, at 404, the femto gateway 28 (e.g., the receiver 74) may receive a first plurality of requests (e.g., requests 208a and 208b of FIG. 2) from the FAP 14 (e.g., from the module 60) over the backhaul channel. In various embodiments, individual requests of the first plurality of requests may be received on substantially a periodic basis with a period of detection time. At 408, the femto gateway 28 (e.g., the module 70) may determine an operational state of the backhaul channel in response to receiving the first plurality of requests. At 412, the femto gateway 28 (e.g., the transmitter 72) may transmit a first plurality of responses (e.g., responses 210a and 210b) to the FAP 14 over the backhaul channel in response to the corresponding first plurality of requests.

At 416, the femto gateway 28 (e.g., the module 70) may determine, after a first time period, a failure state of the backhaul channel in response to non-receipt of a request during the first time period. For example, as previously discussed with respect to FIG. 2, if the request_timer exceeds the first time period and if no request is received during this time period, the femto gateway 28 may determine a failure in the backhaul channel. In various embodiments, the first time period may be at least equal to N times a threshold time period, where N is a non-zero integer, and where individual requests of the first plurality of requests (of block 404) may be periodically received with a period substantially equal to the threshold time period. Thus, if the femto gateway 28 fails to receive N consecutive requests (e.g., requests 218a, . . . , 218N) transmitted by the module 60, the femto gateway 28 may determine a failure in the backhaul channel.

At 420, the femto gateway 28 (e.g., the receiver 74) may receive, subsequent to determining the failure state at 416, a first number of requests (e.g., requests 238a, . . . , 238M). The femto gateway 28 may determine that the first number is greater than a threshold number M. Furthermore, based on determining that the first number is greater than the threshold number M, the femto gateway 28 may determine an end of the failure state of the backhaul channel.

Figure 5:
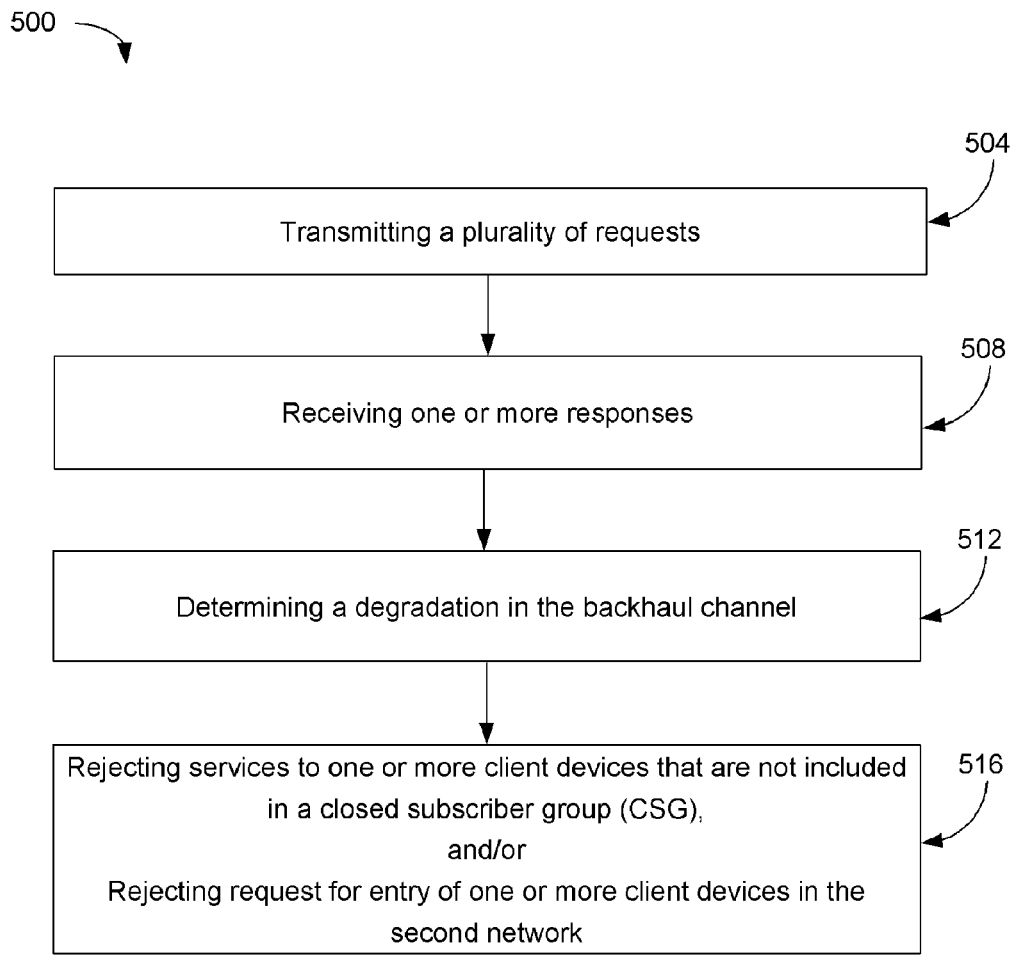

FIG. 5 illustrates another exemplary method 500 for monitoring an operation of the backhaul channel of the communication system 10 of FIG. 1, in accordance with various embodiments of the present disclosure. One or more operations of the method 500 may be performed by the FAP 14. Referring to FIGS. 1, 2 and 5, at 504, the FAP 14 (e.g., the module 60) may transmit a plurality of requests (e.g., requests 208a, 208b, 218a, . . . , 218N, 228a, 228b, 238a, . . . , 238M of FIG. 2) to the femto gateway 28 over the backhaul channel.

At 508, the FAP 14 may receive one or more responses (e.g., responses 210a and 210b of FIG. 2), from the femto gateway 28 over the backhaul channel, indicating an operational state of a backhaul channel. In various embodiments, the one or more responses may be received in response to a corresponding one or more requests (e.g., requests 208a and 208b) of the plurality of requests.

At 512, the FAP 14 (e.g., the module 60) may determine a degradation (e.g., a reduction of bandwidth provided by the second network 22) in the backhaul channel. The module 60 may determine the degradation in the backhaul channel, for example, by measuring a throughout of uplink and/or downlink communication links between the FAP 14 and the femto gateway 28, and/or from one or more responses received from the femto gateway 28.

In various embodiments, one or more of the client devices 50a and 50b may be included in a closed subscriber group (CSG), where the client devices included in the CSG may be given preference by the FAP 14 over remaining client devices. For example, if the FAP 14 is installed in a small office, client devices officially allocated to the staff of the office may be included in the CSG. Other client devices (e.g., personal client devices of the staff, client devices of visitors of the office, etc.) may not be included in the CSG. Thus, the CSG may be a preferred group of client devices, while client devices included in a non-CSG may be a non-preferred group of client devices.

Referring again to FIG. 5, in response to determining the degradation, at 516, the FAP 14 may reject services to one or more client devices that are not included in the CSG, while continuing to provide service to one or more client devices included in the CSG. Additionally or alternatively, in response to determining the degradation, at 516, the FAP 14 may reject request for entry of one or more new client devices in the first network 20.

Figure 6:
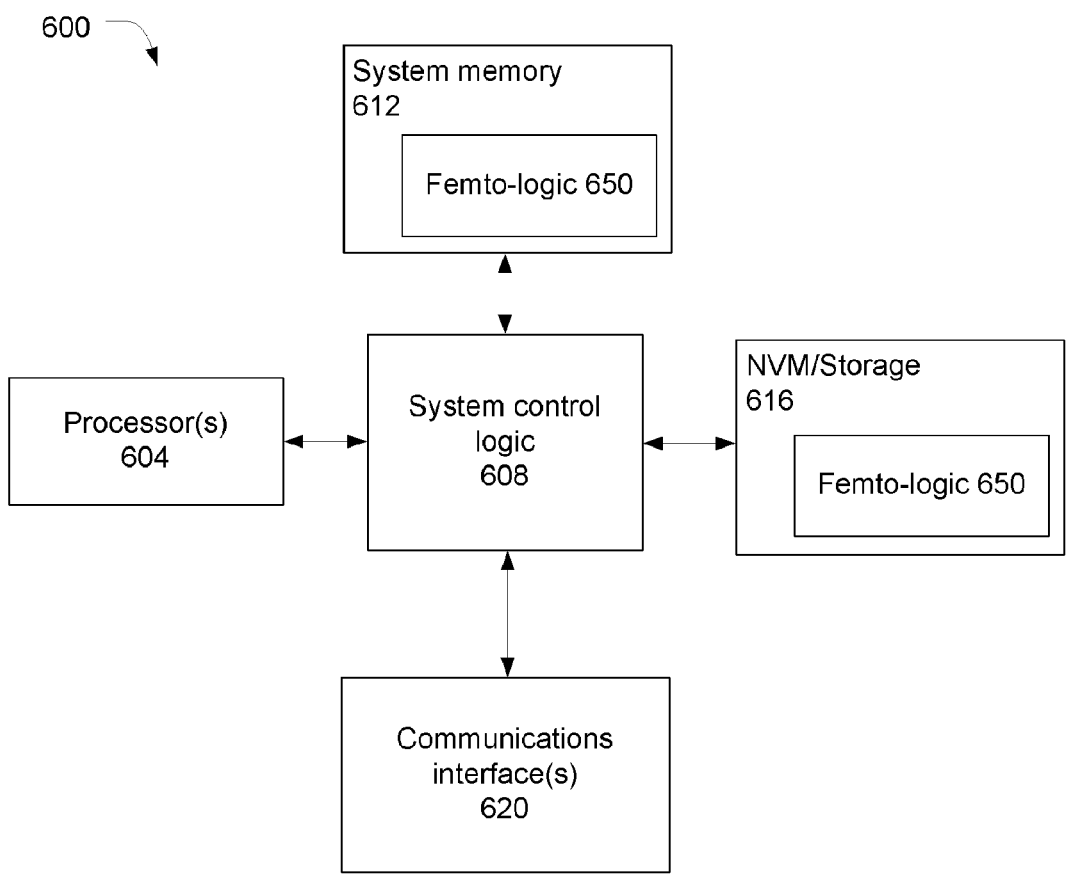
FIG. 6 illustrates an example system capable of implementing a device associated with a first network of the communication system of FIG. 1, in accordance with various embodiments of the present disclosure.

The FAP 14 and/or the femto gateway 28 described herein may be implemented into a system using any suitable hardware and/or software to configure as desired. FIG. 6 illustrates an example system 600 comprising one or more processor(s) 604, system control logic 608 coupled to at least one of the processor(s) 604, system memory 612 coupled to system control logic 608, non-volatile memory (NVM)/storage 616 coupled to system control logic 608, and one or more communications interface(s) 620 coupled to system control logic 608.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

System control logic 608 for one embodiment may include one or more input/output (I/O) controller(s) to provide an interface to NVM/storage 616 and communications interface(s) 720.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

System memory 612 and NVM/storage 616 may include, in particular, temporal and persistent copies of femto-logic 650, respectively.

In various embodiments, the system 600 may at least in part comprise the FAP 14 of FIG. 1. In some of these embodiments, the femto-logic 650 may include instructions that when executed by at least one of the processor(s) 604 result in the system 600 performing monitoring of the backhaul channel, as previously described. In some of these embodiments, the femto-logic 650 may include instructions that when executed by at least one of the processor(s) 604 result in the system 600 performing one or more operations of the methods 300 and 500 of FIGS. 3 and 5, respectively.

In various embodiments, the system 600 may at least in part comprise the femto gateway 28 of FIG. 1. In some of these embodiments, the femto-logic 650 may include instructions that when executed by at least one of the processor(s) 604 result in the system 600 performing monitoring of the backhaul channel, as previously described. In some of these embodiments, the femto-logic 650 may include instructions that when executed by at least one of the processor(s) 604 result in the system 600 performing one or more operations of the method 400 of FIG. 4.

Communications interface(s) 620 may provide an interface for system 600 to communicate over one or more network(s) and/or with any other suitable device over, for example, the backhaul channel of FIG. 1. Communications interface(s) 620 may include any suitable hardware and/or firmware. Communications interface(s) 620 for one embodiment may include, for example, a network adapter, a wireless network adapter, a telephone modem, and/or a wireless modem. For wireless communications, communications interface(s) 620 for one embodiment may use one or more antennae.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, system 600 may have more or less components, and/or different architectures.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   transmitting, by a femto access point (FAP) over a backhaul channel to a gateway associated with a first network, a plurality of requests, wherein individual requests of the plurality of requests are transmitted periodically and the backhaul channel comprises components of a second network that is different from the first network; and
   receiving, by the FAP from the gateway over the backhaul channel, one or more responses indicating an operational state of the backhaul channel, wherein the one or more responses are received in response to a corresponding one or more requests of the plurality of requests.

2. The method of claim 1, wherein the second network is an Internet access network comprising a digital subscriber link or a cable Internet access link.

3. The method of claim 1, further comprising:
   determining a failure state of the backhaul channel based at least in part on non-receipt of responses to another one or more requests of the plurality of requests.

4. The method of claim 3, wherein the another one or more requests includes at least a threshold number of consecutive requests.

5. The method of claim 3, further comprising:
transmitting, by the FAP to one or more client devices in response to determining the failure state, a request to handoff to a neighboring base station.

6. The method of claim 3, further comprising:
determining non-receipt of a first response based on a predetermined time period passing after a corresponding first request of the another one or more requests is transmitted.

7. The method of claim 3, further comprising:
receiving, subsequent to determining the failure state, by the FAP from the gateway over the backhaul channel a first number of responses in response to a corresponding first number of requests of the plurality of requests;
determining that the first number is greater than a threshold number; and
determining, in response to said determining that the first number is greater than the threshold number, an end of the failure state of the backhaul channel.

8. The method of claim 1, further comprising:
determining a degradation in the backhaul channel.

9. The method of claim 8, further comprising:
rejecting, by the FAP based at least in part on determining the degradation, services to one or more client devices that are not included in a closed subscriber group (CSG).

10. The method of claim 8, further comprising:
rejecting, by the FAP based at least in part on determining the degradation, request for entry of one or more client devices in the first network.

11. A method comprising:
receiving, by a gateway over a backhaul channel from an access point (AP), a first plurality of requests, wherein individual requests of the first plurality of requests are received on substantially a periodic basis, wherein the gateway is associated with a first network, wherein the backhaul channel comprises components of a second network that is different from the first network; and
determining, in response to receiving the first plurality of requests, an operational state of the backhaul channel.

12. The method of claim 11, wherein the gateway is a femto gateway.

13. The method of claim 11, further comprising:
transmitting, by the gateway over the backhaul channel to the AP, a first plurality of responses in response to the corresponding first plurality of requests.

14. The method of claim 11, further comprising:
determining, after a first time period, a failure state of the backhaul channel in response to:
non-receipt of a request by the gateway from the AP over the backhaul channel during the first time period.

15. The method of claim 14, further comprising:
transmitting, by the gateway in response to determining the failure state of the backhaul channel, a message to a self organizing network (SON) server indicating the failure state of the backhaul channel.

16. The method of claim 14, wherein the first time period is at least equal to N times a threshold time period, wherein N is a non-zero integer, and wherein individual requests of the first plurality of requests are periodically received with a period substantially equal to the threshold time period.

17. The method of claim 14, further comprising:
receiving, subsequent to determining the failure state, by the gateway over the backhaul channel from the AP, a first number of requests;
determining that the first number is greater than a threshold number; and
determining, in response to said determining that the first number is greater than the threshold number, an end of the failure state of the backhaul channel.

18. An apparatus comprising:
a transmitter configured to periodically transmit, over a backhaul channel to a femto gateway associated with a first network, a plurality of keep-alive requests, wherein the backhaul channel comprises components of a broadband access network;
a receiver configured to receive, during a first time period from the femto gateway over the backhaul channel, one or more keep alive responses that respectively correspond to one or more keep alive requests; and
a backhaul monitoring module configured to:
determine an operational state of the backhaul channel, during the first time period, in response to the receiver receiving the one or more responses during the first time period; and
determine a failure state of the backhaul channel, after a second time period, in response to the receiver failing to receive another one or more responses during the second time period in response to a corresponding another one or more of the plurality of requests.

19. The apparatus of claim 18, wherein the backhaul monitoring module is further configured to:
determine a degradation in the backhaul channel; and
reject, based at least in part on determining the degradation, services to one or more client devices that are not included in a closed subscriber group (CSG).

20. The apparatus of claim 18, wherein the apparatus is a femto access point, and wherein the first network is a Worldwide Interoperability for Microwave Access (WiMAX) network.

\* \* \* \* \*